United States Patent [19]

Achtstaetter

[11] Patent Number: 4,484,110
[45] Date of Patent: Nov. 20, 1984

[54] MONOLITHIC INTEGRATED VERTICAL-DEFLECTION CIRCUIT FOR TELEVISION SETS WITH TANGENT-CORRECTED, LINE-FREQUENCY-DERIVED DIGITAL SIGNAL GENERATION

[75] Inventor: Gerhard Achtstaetter, Gundelfingen, Fed. Rep. of Germany

[73] Assignee: ITT Industries, Inc., New York, N.Y.

[21] Appl. No.: 505,197

[22] Filed: Jun. 17, 1983

Related U.S. Application Data

[63] Continuation of Ser. No. 326,638, Dec. 2, 1981, abandoned.

[30] Foreign Application Priority Data

Dec. 8, 1980 [EP] European Pat. Off. ........ 80107715.7
Jun. 16, 1981 [EP] European Pat. Off. ........ 81104620.0

[51] Int. Cl.$^3$ ..................... H01J 29/70; H01J 29/72
[52] U.S. Cl. ............................. 315/364; 315/367
[58] Field of Search .............. 315/364, 367, 396, 397, 315/403

[56] References Cited

U.S. PATENT DOCUMENTS

4,171,504 10/1979 Strathman .......................... 315/367
4,251,754 2/1981 Navarro et al. .................... 315/367

Primary Examiner—Theodore M. Blum
Attorney, Agent, or Firm—Donald J. Lenkszus

[57] ABSTRACT

The horizontal-deflection pulses (HA) and the vertical synchronizing pulses (VS) are applied to the count input (Ez) and the reset input (Er) of an upcounter (VZ) whose count outputs are connected to the address inputs (Ea) of a programmable read-only memory (PROM1) via a decoder (DC). The S-shaped characteristic of the deflection-stage current is approximated by portions of constant slope whose associated slope values are stored in the programmable read-only memory (PROM1) under one address each. The pulses of a clock generator (TG2) whose frequency is chosen so that when a first presettable down-counter (RZ1) is set to the highest slope value, its zero state is reached within line period are applied via one of the input-output paths of an AND gate (UG1) to this first presettable down-counter (RZ1), which is preset by the programmable read-only memory (PROM1) via first input-output paths of a multiple AND gate (MU1) and whose zero-state output (AO) is connected to the other input of the AND gate (UG1), while the other inputs of the multiple AND gate (MU1) are fed with the horizontal-deflection pulses (HA). The output pulses of the AND gate (UG1) are divided by a frequency divider (FT) and then counted in synchronism with the field frequency by a first presettable up-counter (VV1) which is preset by a second programmable read-only memory (PROM2) in which a digital word corresponding to the deflection current at the top or bottom of the image is stored. The pulses of another clock generator (TG1) are counted by a second presettable down-counter (RZ2) and a second presettable down-counter (VV2) after passing through one of the input-output paths of a second AND gate (UG2) and a third AND gate (UG3), respectively. The counts of the first presettable up-counter (VV1) preset the second presettable down-counter (RZ2) and the second presettable up-counter (VV2) via the first input-output paths of a second multiple AND gate (MU2) and a third multiple AND gate (MU3), respectively. The horizontal-deflection pulses (HA) are applied to the second inputs of the second and third multiple AND gates (MU2, MU3), whose third inputs are connected, via an inverter (IV) and directly, respectively, to the output (Am) of the first presettable up-counter (VV1) for the most significant bit. The count outputs of the second presettable down- and up-counters (RZ2, VV2) are respectively connected via first and second multiple OR gates (MO1, MO2) to the drive-signal outputs (A', A") for one and the other half of the image, which outputs are also coupled to the other inputs of the second AND gate (UG2) and the third AND gate (UG3), respectively.

35 Claims, 1 Drawing Figure

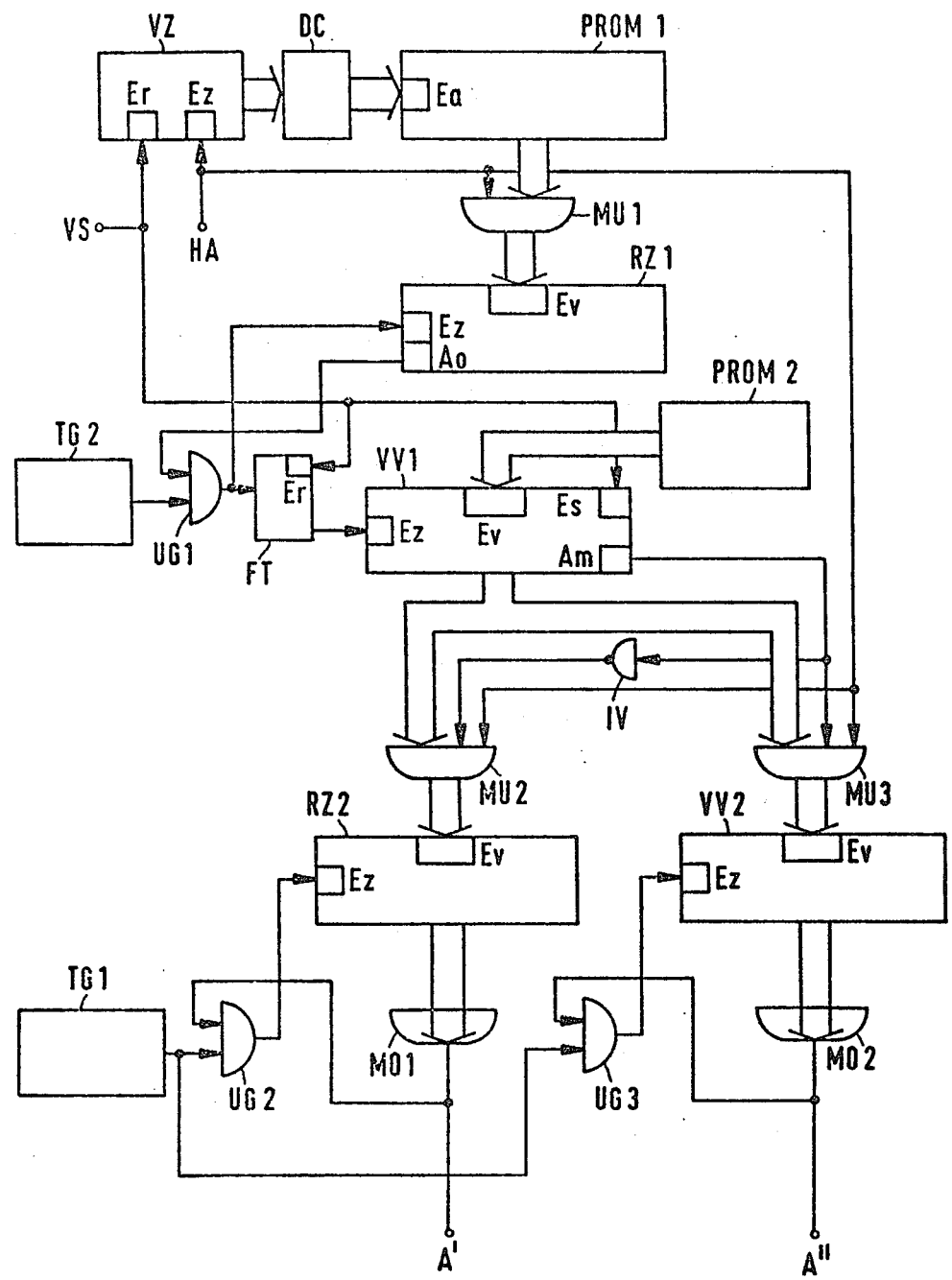

MONOLITHIC INTEGRATED VERTICAL-DEFLECTION CIRCUIT FOR TELEVISION SETS WITH TANGENT-CORRECTED, LINE-FREQUENCY-DERIVED DIGITAL SIGNAL GENERATION

This is a continuation of application Ser. No. 326,638 filed Dec. 2, 1981 now abandoned.

The present invention relates to a monolithic integrated vertical-deflection circuit for television sets with tangent-corrected line-frequency-derived digital generation of the pulse-width-modulated signal for directly driving a class-D push-pull vertical-deflection stage, as is shown in FIG. 4 of DE-OS No. 28 05 691 and described there on pages 14 et seq., or for driving a class-B push-pull analog vertical-deflection stage via an integrator. The prior art vertical-deflection circuit contains an up-counter serving as an address generator for a first programmable read-only memory which holds digital words for every two adjacent lines. The arrangement further includes a second programmable read-only memory which holds a digital word corresponding to the deflection current at the top or bottom of the image, i.e., a so-called initial value. A first clock generator whose frequency is of the order of the color-subcarrier frequency, namely twice as high, is coupled to the count inputs of a first counter and a second counter, called "difference counters" there, and whose outputs provide the pulse-width-modulated drive signals for the upper and lower halves of the image.

The present invention is based on these subcircuits of the prior art arrangement. However, the prior art arrangement requires quite a number of additional subcircuits, such as a multiplexer, two adders, a so-called averaging stage comprising a comparator, an adder, a buffer memory, and several logic gates, as well as a stage for forming twos complements, a pulse shaper, and a data-blocking device. The prior art arrangement is thus rather expensive.

This applies particularly to the first programmable read-only memory, whose number of rows must be at least equal to half the number of lines of a field, i.e., 156 rows in the case of the 625-line-standard system, for example.

The object of the invention as characterized in the claim is to provide a monolithic integrated vertical-deflection circuit for television sets which is considerably simpler in design than the prior art arrangement, requires a considerably reduced number of rows in the first programmable read-only memory in particular, and dispenses with the adders and the averaging stage of the prior art arrangement, i.e., the overall circuit is to be implemented with simpler digital stages.

The principal advantages of the invention are that only counters—this general term also covers the frequency divider used—, logic gates, and a decoder are necessary, and that a reduction of the number of rows of the first programmable read-only memory to about one fifth is achieved. Thus, a considerably smaller chip area is required, so that the integrated circuit can be formed on a chip much smaller than that required for the prior art arrangement. Another advantage is that fewer circuit types are necessary than with the prior art arrangement, namely only memories, counters and logic gates, so that with the basic elements characteristic of these individual circuit types, a more advantageous division of the chip area is possible. This advantage is based on the elimination of the multiplexer, the adders, and the comparators, which digital-circuit types are more complicated and costly than counters and logic gates.

The invention will now be explained in more detail with reference to the accompanying drawing, which is a block diagram of an embodiment of the invention.

The up-counter VZ corresponds to the line counter of the above-mentioned DE-OS (not shown there in FIG. 4, however) and performs the function of this line counter in the present invention. Its count input Ez is fed with horizontal-deflection pulses HA, which it counts until it is reset to zero by the vertical synchronizing pulses VS applied to its reset input Er. The up-counter VZ thus serves to "number" the lines of a field so that corresponding addresses for selecting the address inputs Ea of the first programmable read-only memory PROM 1 can be derived by means of the decoder DC.

According to the invention, this read-only memory holds only slope values which are obtained by approximating the S-shaped characteristic of the deflection-stage current by portions of constant slope. The storage of only these slope values results in the above-mentioned advantage of the considerable reduction in the number of rows of the first programmable read-only memory, for only 25–30 slope values need to be stored for the entire S-shaped characteristic of the deflection-stage current to obtain sufficient accuracy. These slope values can be adapted by the television-set manufacturer to the concrete characteristics of the picture tube used and of the associated deflection system, and they can be programmed into the first programable read-only memory PROM1 by the television-set manufacturer at the factory.

This programming for presetting given values of a digital circuit is thus completely analogous to the known setting of values of analog circuits by means of variable capacitors, potentiometers or variometers.

Since, according to the invention, only slope values have to be stored, only a single address is necessary for all those lines of a field which lie in the linear portion of the deflection characteristic, so that the "number of lines" of the decoder DC is equal to that of the first programmable read-only memory PROM1; thus, the area requirement of the decoder is relatively small.

The contents of the addressed row are now transferred in parallel via the parallel output of the first programmable read-only memory PROM1 and the first multiple AND gate MU1 to the preset input Ev of the first presettable down-counter RZ1 at the repetition rate of the horizontal deflection pulses HA. The first multiple AND gate MU1, indicated in the drawing by the logic symbol of an ordinary AND gate with a stripe-like input lead, combines each individual output lead with the lead carrying the horizontal deflection pulses HA. Thus, the multiple AND gate MU1 consists in reality of as many AND elements as there are leads connected to the parallel output of the first programmable read-only memory PROM1. The same applies analogously to the other multiple AND gates and multiple OR gates.

The count input Ez of the first presettable down-counter RZ1 is connected to the output of the first AND gate UG1, one input of which is connected to the output of the second clock generator TG2, and the other input of which is connected to the zero-state output A0 of the first presettable down-counter RZ1. By "zero-state output" a wiring of the first presettable down-counter RZ1 is to be understood which, when this counter passes through its zero state, provides a pulse whose level is assigned to the more negative level L of two binary-signal levels H, L in positive logic, which is assumed herein. This wiring is, for example, an OR gate which ORs all counts and, thus, provides the aforementioned L pulse only if all counts are at L level.

The frequency of the second clock generator TG2 must be chosen so that the first presettable down-counter RZ1 reaches its zero state within one line period after being set to the highest slope value. With the aforementioned 25 to 30 rows of the first programmable read-only memory PROM1 and in the 625-line-standard system, the frequency of the second clock generator TG2 is about 2 to 4 MHz.

The output of the first AND gate UG1 is coupled to the count input Ez of the first presettable up-counter VV1 via the frequency divider FT, whose reset input Er is presented with the vertical synchronizing pulses. This is necessary because at the end of a field, the frequency divider FT may be in a state other than the zero state; the zero state must be established via the reset input Er at the beginning of the next field.

On application of each vertical synchronizing pulse VS to its preset enable input Es, the first presettable down-counter VV1 is preset via the preset input Ev by means of the digital word in the second programmable read-only memory PROM2. This digital word corresponds to the deflection current at the top or bottom of the image and can be programmed as a digital value by the manufacturer of the television set.

The frequency divider FT makes it possible to reduce the count capacity of the first presettable up-counter VV1 and the frequency of the first clock generator TG1. It also permits the multiple AND gates MU2, MU3, the multiple OR gates MO1, MO2, and the counters RZ2, VV2 to be designed to process shorter digital words. For example, the capacity of the counter VV1, which, if no frequency divider were used, would be 15 bits, for example (with 8 bits for the first programmable read-only memory PROM1), can be reduced to 11 bits. Thus, the subcircuits MU2, MU3, MO1, MO2, RZ2 and VV2 have word lengths of 11 bits, too. Moreover, at such values, the frequency of the first clock generator TG1 would have to be 16 times as high if the frequency divider FT were not present, and this could not be implemented.

The count outputs of the first presettable up-counter VV1 are connected via the first input of the second multiple-AND gate MU2 to the preset parallel input Ev of the second presettable down-counter RZ2 and via the first input of the third multiple AND gate MU3 to the preset parallel input Ev of the second presettable up-counter VV2. The second input of the multiple AND gates MU2, MU3 are fed with the horizontal deflection pulses HA, while the third input of the third multiple AND gate MU3 is connected to the output Am of the first presettable up-counter VV1 for the most significant bit, and the corresponding third input of the second multiple AND gate MU2 is fed with this output signal via the inverter IV. The most significant bit of the first presettable up-counter VV1 thus determines which of the two counters RZ2, VV2 is counting, i.e., this causes the picture to be divided into two halves.

The count inputs Ez of the two counters RZ2 and VV2 are connected to the output of the first clock generator TG1 via the first input-output paths of the second AND gate UG2 and the third AND gate UG3, respectively. The parallel outputs of the counters RZ2, VV2 are connected via the first multiple OR gate MO1 and the second multiple OR gate MO2 to the drive-signal outputs A' and A", respectively, the outputs of these two multiple OR gates being also coupled to the second inputs of the second AND gate UG2 and the third AND gate UG3, respectively. Thus, when the counters RZ2, VV2 reach their zero states, the outputs of the following multiple OR gates MO1, MO2 provide an L level, which stops, via the associated AND gates UG2, UG3, the supply of further count pulses until the counters RZ2, VV2, are preset to a new value.

The arrangement is thus constructed so that if the drive-signal output A" provides a pulse whose duration decreases with increasing number of lines, the duration of pulse appearing at the drive-signal output A' will increase as the number of lines continues to increase. These two pulses are suitable for driving a class-D push-pull vertical deflection stage as shown in the above-mentioned FIG. 4 of DE-OS 28 05 691, for example, or, via an integrator, a conventional class-B push-pull analog vertical-deflection stage.

The second presettable down-counter RZ2 and the second presettable up-counter VV2 correspond to the two difference counters shown in FIG. 4 of the prior art reference.

As the invention uses exclusively digital subcircuits, its circuit can be preferably implemented employing so-called MOSFET technology, i.e., integrated circuits using insulated-gate field-effect transistors, because this technology is better suited to implementing digital circuits than conventional bipolar technology.

If a class-A single-ended deflection stage is to be used instead of a class-D or class-B push-pull vertical-deflection stage, it is possible to dispense with the second presettable up-counter VV2 and the associated subcircuits UG3, MO2, MO3 without departing from the basic idea of the invention.

I claim:

1. A deflection circuit comprising:
    first means for generating a sequence of pulse width modulated signals in response to a sequence of first digital words;
    second means for generating a first one of said first digital words in each said sequence of digital words from a second digital word representative of an initial value of a characteristic curve;
    third means for generating each successive one of said sequence of first digital words by modifying the previous one of said first digital words in accordance with a predetermined one of a plurality of third digital words, each of said third digital words representing a predetermined slope value of a portion of said characteristic curve.

2. A deflection circuit in accordance with claim 1 comprising:
    memory means for storing said third digital words at predetermined addressable memory locations.

3. A deflection circuit in accordance with claim 2, wherein said third means comprises:
    means responsive to first periodically recurring signals for generating address signals representative of the memory location containing the third word to be used for modifying said previous one of said first digital words.

4. A deflection circuit in accordance with claim 3, wherein said address signal generating means comprises:

first counter means responsive to said first periodically recurring signals for generating line count signals; and decoder means responsive to said line count signals for generating said address signals.

5. A deflection circuit in accordance with claim 4, wherein said decoder means generates identical ones of said address signals for predetermined adjacent scan lines represented by said line count signals.

6. A deflection circuit in accordance with claim 4, wherein said counter means is initialized to a predetermined line count state in response to second periodically recurring signals.

7. A deflection circuit in accordance with claim 4, wherein said first periodically recurring signals are horizontal deflection pulses.

8. A deflection circuit in accordance with claim 5, wherein said first periodically recurring signals are horizontal deflection pulses.

9. A deflection circuit in accordance with claim 6, wherein said first periodically recurring signals are horizontal deflection pulses; and said second periodically recurring signals are vertical synchronization pulses.

10. A deflection circuit in accordance with claim 2, wherein said second means comprises second counting means and fourth means for presetting said first counting means to a predetermined state whereby said second counter means generates said first one of said second digital words.

11. A deflection circuit in accordance with claim 10, wherein said third means comprises:

means responsive to first periodically recurring signals for generating address signals representative of the memory location containing the third word to be used for modifying said previous one of said first digital words.

12. A deflection circuit in accordance with claim 11, wherein said address signal generating means comprises:

first counter means responsive to said first periodically recurring signals for generating line count signals; and decoder means responsive to said line count signals for generating said address signals.

13. A deflection circuit in accordance with claim 12, wherein said decoder means generates identical ones of said address signals for predetermined adjacent scan lines represented by said line count signals.

14. A deflection circuit in accordance with claim 12, wherein said counter means is initialized to a predetermined line count state in response to second periodically recurring signals.

15. A deflection circuit in accordance with claim 12, wherein said first periodically recurring signals are horizontal deflection pulses.

16. A deflection circuit in accordance with claim 13, wherein said first periodically recurring signals are horizontal deflection pulses.

17. A deflection circuit in accordance with claim 14, wherein said first periodically recurring signals are horizontal deflection pulses; and said second periodically recurring signals are vertical synchronization pulses.

18. A deflection circuit in accordance with claim 10, wherein said first means comprises third counter means presettable by each said first digital word for count at a predetermined rate to a predetermined count state; and fifth means responsive to said third counter means for generating said pulse width modulated signals, the duration of each said pulse width modulated signal being determined by the time that said third counter means is not in said predetermined count state.

19. A deflection circuit in accordance with claim 18, wherein said predetermined rate is of the same order as a color subcarrier frequency.

20. A deflection circuit in accordance with claim 19 comprising:

a first clock generator providing clock signals at said first predetermined rate.

21. A deflection circuit in accordance with claim 18, wherein said third means comprises:

means responsive to first periodically recurring signals for generating address signals representative of the memory location containing the third word to be used for modifying said previous one of said first digital words.

22. A deflection circuit in accordance with claim 21, wherein said address signal generating means comprises:

first counter means responsive to said first periodically recurring signals for generating line count signals; and decoder means responsive to said line count signals for generating said address signals.

23. A deflection circuit in accordance with claim 22, wherein said decoder means generates identical ones of said address signals for predetermined adjacent scan lines represented by said line count signals.

24. A deflection circuit in accordance with claim 22, wherein said counter means is initialized to a predetermined line count state in response to second periodically recurring signals.

25. A deflection circuit in accordance with claim 22, wherein said first periodically recurring signals are horizontal deflection pulses.

26. A deflection circuit in accordance with claim 23, wherein said first periodically recurring signals are horizontal deflection pulses.

27. A deflection circuit in accordance with claim 24, wherein said first periodically recurring signals are horizontal deflection pulses; and said second periodically recurring signals are vertical synchronization pulses.

28. A deflection circuit in accordance with claim 10, wherein said first means comprises:

third counter means presettable by certain ones of said first digital words for counting at a predetermined rate to a first predetermined count state;

fifth means responsive to said third counter means for generating certain ones of said pulse width modulated signals the duration of each of said certain ones of said pulse width modulated signals being determined by the time that said third counter means is not in said first predetermined count state.

29. A deflection circuit in accordance with claim 28, wherein said first means comprises:

fourth counter means presettable by other ones of said first digital words for counting at said predetermined rate to a second predetermined count state;

sixth means responsive to said fourth counter means for generating other ones of said pulse width modulated signals, the duration of each of said other ones of said pulse width modulated signals being determined by the time that said fourth counter means is not in said second predetermined count state.

30. A deflection circuit in accordance with claim 18, wherein said predetermined rate is of the same order as a color subcarrier frequency.

31. A deflection circuit in accordance with claim 2, wherein said memory means comprises a programmable read only memory.

32. A deflection circuit in accordance with claim 10, wherein said memory means comprises a programmable read only memory.

33. A deflection circuit in accordance with claim 32, wherein said fourth means comprises a second programmable read only memory for storing said first one of said second digital words.

34. A vertical deflection circuit comprising:
- a first memory for storing a digital word corresponding to the deflection current at a predetermined line of an image;
- a first counter adapted to be preset to said digital word upon each occurrence of a vertical synchronization pulse;
- a second memory having a plurality of addressable locations and storing in each of said locations a first digital word representing a constant slope value approximately a portion of the deflection current characteristic curve;
- logic circuit means for generating addresses to read said plurality of addressable locations in response to horizontal deflection pulses;
- a second counter adapted to be preset by each said first digital word, read from said second memory;
- a first clock circuit having an output coupled to the count input of said second counter and generating first clock pulses at a first predetermined rate to cause said second counter to count at said first predetermined rate;
- said second counter being adapted to provide control signals to said first clock source whenever said second counter is a first predetermined count state, said first clock circuit not providing said first clock pulses to said second counter while said control signals are present;
- circuit means coupling said first clock circuit to said first counter such that said first counter counts at a second predetermined rate while said second counter is counting;
- a third counter having inputs coupled to the outputs of said first counter and being preset to a first state for predetermined lines according to the state of said first counter;
- a second clock circuit for generating third clock pulses to cause said third counter to count at a third predetermined rate; and
- second circuit means coupled to the output of said third counter for providing first output pulses, the duration of each of said first output pulses being determined by the time said third counter takes to count to a second predetermined state from said first preset state.

35. A vertical deflection circuit in accordance with claim 34 comprising:
- a fourth counter having inputs coupled to the outputs of said first counter and being preset to a first stated for predetermined lines according to the state of said first counter;
- said second clock circuit generating fourth clock pulses to cause said fourth counter to count at said third predetermined rate; and
- third circuit means coupled to the output of said fourth counter for providing second output pulses, the duration of each of said second output pulses being determined by the time said second counter takes to count to a third predetermined state from said fourth counter first preset state.

* * * * *